Feb. 17, 1925.

L. CURATOLO

AIR COOLING FAN

Filed May 26, 1924

1,526,836

INVENTOR
Luigi Curatolo
BY
ATTORNEY

Patented Feb. 17, 1925.

1,526,836

UNITED STATES PATENT OFFICE.

LUIGI CURATOLO, OF LAWRENCE, MASSACHUSETTS.

AIR-COOLING FAN.

Application filed May 26, 1924. Serial No. 715,801.

*To all whom it may concern:*

Be it known that I, LUIGI CURATOLO, a citizen of the United States, residing at Lawrence, in the county of Essex and State of Massachusetts, have invented certain new and useful Improvements in Air-Cooling Fans, of which the following is a specification.

This invention relates to fans such as are used for cooling the air in rooms, the invention having for an object the provision of a simple and novel arrangement of parts whereby the blast of the fan may be directed as desired in different directions.

For further comprehension of the invention, and of the objects and advantages thereof, reference will be had to the following description and accompanying drawing, and to the appended claim in which the various novel features of the invention are more particularly set forth.

Fig. 1 of the drawing is a plan view showing my improved fan.

Figure 1:
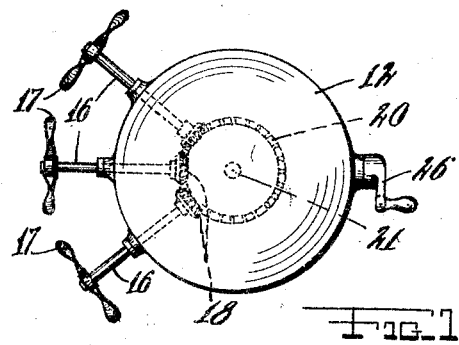
Figure 2:
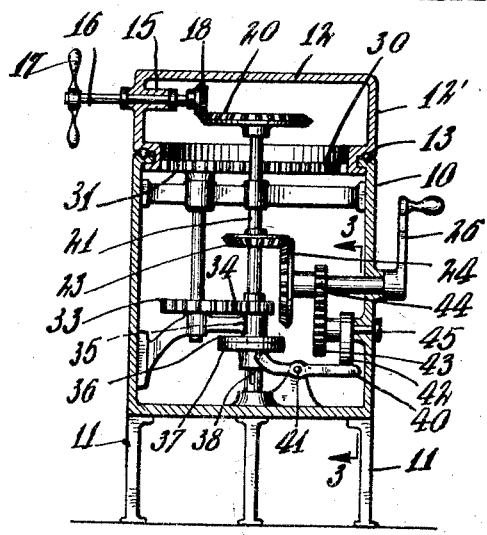
Fig. 2 is an axial vertical sectional view thereof.
Figure 3:
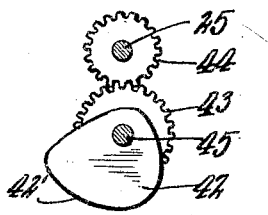
Fig. 3 is a detail vertical sectional view taken on the line 3—3 of Fig. 2.

Referring now to the drawing the reference numeral 10 indicates a cylindrical casing which is arranged on a vertical axis and which may have feet 11. This casing is open at its upper end and on this upper end is mounted a cap 12 which is rotatable thereon, this cap having a depending flange 12' of equal diameter with the casing. Anti-friction bearings such as 13 may be interposed between the cap and the casing. Supported in suitable bearing bosses 15 in the flange of the cap are a number of radial shafts 16 which have fans 17 of the usual helical type mounted on their outer ends, and bevel pinions 18 mounted on their inner ends.

These bevel pinions all mesh with a common gear 20 of large diameter which is fixed on the upper end of a shaft 21 which extends axially through the casing 10 and is suitably supported therein. Fixed on this shaft 21 toward the lower end thereof, is a bevel gear 23 which meshes with another bevel gear 24 on the inner end of a horizontal shaft 25 which extends outwardly through the side of the casing and has a crank handle 26 on its outer end for turning purposes, although it will be understood that mechanical means for rotating the shaft 25 may be provided if desired.

Formed on the bottom of the flange 12' of the cap 12 is an internal gear 30 which is engaged by a spur pinion 31 on the upper end of a second vertical shaft 32 in the casing, this shaft 32 having a second spur gear 33 on its lower end which is engaged by a spur pinion 34 freely surrounding the shaft 21 below the gear 23 on the latter. This spur pinion 34 is rigidly fixed, as by the hub connection 35, with a friction clutch disk 36 also free on the shaft 21, and which is engaged at times by a second friction clutch disk 37, this latter clutch disk being feathered on the shaft as indicated at 38.

Means are provided whereby the disk 37 is caused to be intermittently brought into engagement with the disk 36, to impart an intermittent slow rotation to the cap 12 on the top of the casing 10. As here shown lever 40 is fulcrumed between its ends as at 41 in the casing 10 and is adapted to bear upwardly at one end on the clutch disk 37 while its other end projects under the rotary cam 42 which is fixed co-axially to a spur gear 43 which is engaged by a spur pinion 44 fixed on the shaft 25, the gear 43 and cam 42 being freely supported on a short shaft 45 suitably journaled in the side of the casing 10. The cam 42 presents an arcuate high portion 42' which is concentric to the shaft 45 and which is adapted to bear on the lever 40 during a portion of each rotation of the cam to cause the clutch disk line 36 thereby causing the cap 12 to slowly rotate until the cam 42 rides off the end of the lever.

It is believed that the manner of operation and use of my improved fan will be readily understood from the above description, it being apparent that when the shaft 25 is caused to rotate the various fans will be driven at relatively high speed, while the fan support or carriage constituted by the cap 12 will be given an intermittent slow rotary movement.

While I have illustrated and described a preferred embodiment of my invention it is to be understood that I do not limit myself to the precise construction herein shown, and that various changes and modifications might be made therein without departing from the spirit and scope of the invention as defined in the appended claim.

Having thus described my invention, what I claim as new and desire to protect by Letters Patent of the United States is as follows:—

A device of the class described comprising a casing, a rotary fan support thereon, a number of shafts carried by said support and extending radially thereof, fans on the outer ends of said shafts, bevel pinions on the inner ends of said shafts, a vertical shaft in the casing, a bevel gear on said shaft meshing with each of said bevel pinions, drive means connected to said vertical shaft, and means whereby said drive means is intermittently connected to said support to rotate the latter, comprising an internal gear formed on said support, a friction clutch disk, an operative connection between said friction clutch disk and said internal gear, a second friction clutch disk feathered on said vertical shaft adjacent the first friction clutch disk, a lever mounted in said casing in position to engage said second friction clutch disk and move it into engagement with the first one, and a cam rotated by the said drive means and positioned to intermittently engage and operate said lever to cause said second friction clutch disk to move it into engagement with the first one.

In testimony whereof I have affixed my signature.

LUIGI CURATOLO.